United States Patent [19]
MacFarland et al.

[11] 4,078,652
[45] Mar. 14, 1978

[54] ARTICLE FEEDER

[75] Inventors: Raymond W. MacFarland, Valley View; Orvin M. Benson, Bay Village, both of Ohio

[73] Assignee: Computron, Inc., Valley View, Ohio

[21] Appl. No.: 699,891

[22] Filed: Jun. 25, 1976

[51] Int. Cl.² ............................................. B65G 47/12
[52] U.S. Cl. ................................... 198/443; 198/383; 198/493; 198/817
[58] Field of Search ............... 198/380, 383, 390, 395, 198/396, 398, 443, 447, 453, 493, 503, 817

[56] References Cited

U.S. PATENT DOCUMENTS

| | | | |
|---|---|---|---|
| 1,405,233 | 1/1922 | Lemoine | 198/817 |
| 1,881,514 | 10/1932 | Keller et al. | 198/367 |
| 2,813,617 | 11/1957 | Sheetz | 198/817 X |
| 2,928,599 | 3/1960 | Ahlburg | 198/503 X |
| 2,956,665 | 10/1960 | Arlin | 198/383 |
| 2,966,250 | 12/1960 | Robock | 198/396 X |
| 3,008,564 | 11/1961 | Lakso | 198/503 X |
| 3,104,753 | 9/1963 | Osborne | 198/447 |
| 3,143,201 | 8/1964 | Wyle et al. | 198/380 X |
| 3,841,471 | 11/1972 | Mead | 198/383 |

*Primary Examiner*—John J. Love
*Assistant Examiner*—Richard K. Thomson
*Attorney, Agent, or Firm*—Woodling, Krost, Granger & Rust

[57] ABSTRACT

A machine for conveying similarly shaped articles in a single file is disclosed comprising drive and return conveyors with said drive conveyor having a loading portion and a discharge portion. A plurality of similarly shaped articles are loaded at the loading portion of the drive conveyor. A separator separates the articles in a single file on the drive conveyor and ejects articles from the drive conveyor which vary from the single file. The return conveyor forms an angle relative to the drive conveyor for receiving the ejected articles from the drive conveyor to return the ejected articles on the return conveyor to the drive conveyor.

22 Claims, 10 Drawing Figures

ARTICLE FEEDER

BACKGROUND OF THE INVENTION

1. Field of the invention

This invention relates to item feeders and more particularly to power drive conveyors having means for arranging articles on the conveyors in a single or multiple row.

2. Description of the Prior Art

Many types of devices and machines have been available to the prior art for conveying a plurality of similarly shaped articles in a single file. Conveyors have been used for orienting and conveying food products such as beans, eggs, canned goods and the like. These conveyors were generally slow and designed for a specific shape of articles and could not be adapted to convey a variety of differentialy shaped articles. A further disadvantage of the conveyors of the prior art was the inability to feed very small items such as nuts, bolts, pills and the like. Accordingly, the art developed vibratory bowl feeders using a vibrating bowl having a substantially helical path whereby the particles were advanced on the helical path as the bowl was vibrated by electromagnetic means. The vibratory bowl feeders provided excellent feeding for small parts but were unsuitable for parts that were easily damaged. The vibratory bowl feeders had the inherent ability to feed a variety of differently shaped parts without change to the bowl assembly.

Accordingly, it is an object of this invention to provide a machine for conveying similarly shaped articles in a single file which is capable of high speed conveyance and separation of fragile articles.

Another object of this invention is to provide a machine for conveying similarly shaped articles in a single file which is less expensive than the conveyors heretofore known to the art and yet which is versatile enough to be adaptable to various shapes of articles.

Another object of this invention is to provide a machine for conveying similarly shaped articles in a single file which subjects the articles to less vibration than the vibratory bowl feeders known to the art.

Another object of this invention is to provide a machine for conveying similarly shaped articles in a single file which is adapted to receive sensing means for sensing the number of articles being conveyed thereby and gate means for diverting articles in excess of a predetermined number of articles.

SUMMARY OF THE INVENTION

The invention may be incorporated into a machine for receiving similarly shaped articles from a loading station and discharging the articles in a single file, comprising in combination, conveyor means having a drive and a return conveyor means with said drive conveyor means having a loading portion and a discharge portion, said drive conveyor means being capable of conveying the articles from said loading portion to said discharge portion of said drive conveyor means and discharging the articles therefrom, means mounting said conveyor means for receiving the similarly shaped articles from the loading station at said loading portion of said drive conveyor means, separator means including said drive conveyor means for separating the articles in a single file on said drive conveyor means and for ejecting the articles from said drive conveyor means which vary from a single file, and means for mounting said return conveyor means at an angle relative to said drive conveyor means enabling said return conveyor means to receive said ejected articles from said drive conveyor means and to return said ejected articles to said drive conveyor means.

Other objects and a fuller understanding of the invention may be had by referring to the following description and claims, taken in conjunction with the accompanying drawings.

DESCRIPTION OF THE PREFERRED EMBODIMENT

Figure 1:
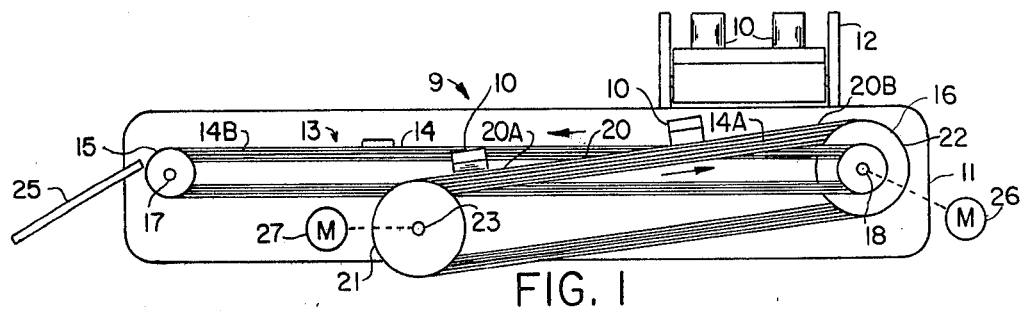
FIG. 1 is a side view of the internal mechanism of a machine for conveying similarly shaped articles in a single file.

FIG. 1 is a side view showing the internal mechanism of a machine 9 for receiving a plurality of similar shaped articles 10 shown as photo flash cubes, for example, from a loading station 12 shown as a conventional conveyor loader. The machine 9 comprises a frame 11 and conveyance means 13 including drive conveyor means 14 extending between pulleys 15 and 16 respectively mounted on shafts 17 and 18 and return conveyor means 20 extending between pulleys 21 and 22 respectively mounted on shafts 23 and 18. The drive conveyor 14 is capable of conveying the articles 10 as shown by the arrow from a loading portion 14A of the drive conveyor to a discharge portion 14B of the drive conveyor 14 and to discharge the items 10 to an article receiver 25 shown as a chute. The loader 12 is mounted relative to the drive conveyor 14 to load the plurality of similarly shaped articles 10 onto the loading portion 14A of the drive conveyor 14. The return conveyor 20 is mounted at an angle in a vertical plane relative to the drive conveyor 14 with a portion 20A of the return conveyor 20 being below a portion of the drive conveyor 14 and with a portion 20B of the return conveyor 20 being above a portion of the drive conveyor 14.

Each of the drive and return conveyors 14 and 20 comprises a plurality of conveyor bands each having a cross-section which in this preferred embodiment is shown as circular, but it may be many other shapes. The bands are mounted on a single conically shaped pulley having a plurality of grooves for receiving the plurality of bands. The pulleys may be fabricated of a plurality of pulley components of varying size each accommodating a single conveyor bank which are stacked to form the structure shown.

The drive and return conveyors 14 and 20 may be driven by a single motor or may be driven by plural motors as schematically shown with motor 26 connected to shaft 18 which is in engagement with pulley 16 whereas pulley 22 is freely rotatable about shaft 16. A motor 27 drives pulley 21 on shaft 23 such that the conveyors move oppositely as shown by the arrows in FIGS. 1 and 2.

Figure 2:
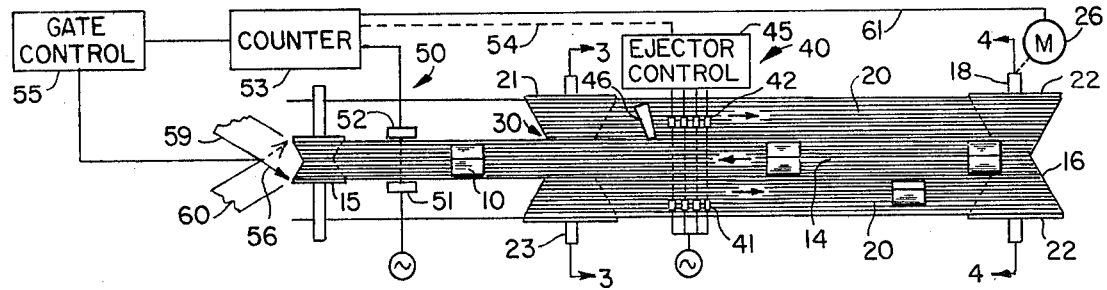
FIG. 2 is a top view of the machine shown in FIG. 1 illustrating means for sensing the conveyance of similarly shaped articles in a single file.
Figure 3:
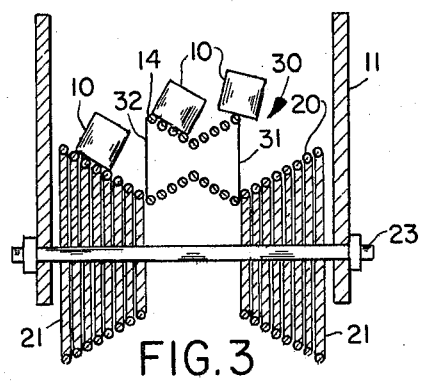
FIG. 3 is a sectional view taken on line 3—3 of FIG. 2.
Figure 4:
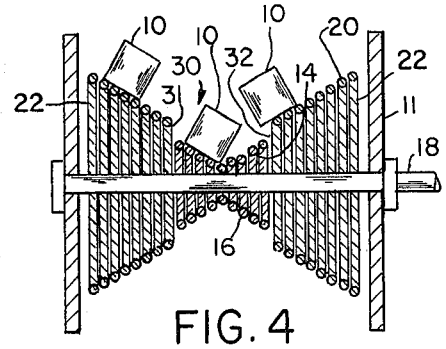
FIG. 4 is a sectional view taken on line 4—4 of FIG. 2.

FIGS. 2-4 illustrate that the return conveyor means 20 is composed of a first and a second return conveyor located on a first and a second side of the drive conveyor 14. The drive conveyor has a V shape interposed between the two return conveyors each comprising half of a V shape. The section shown in FIG. 3 illustrates the height of the drive conveyor 14 relative to the return conveyors 20 at shaft 23 whereas FIG. 4 illustrates the height of the drive conveyor 14 relative to the return conveyors 20 at shaft 18. Separator means 30 comprises the conveyance means 13 including the V shape of the drive conveyor 14 in addition to derailers 31 and 32 enable separation of the articles 10 into a single file on the drive conveyor 14. Thd derailers 31 and 32 are shown as sheet metal members extending between shafts 17 and 18 and approximating the maximum perimeter of the drive conveyor means 14. The articles varying from the single file on the drive conveyor reach a point of instability on the drive conveyor 14 between portions 14A and 14B as shown in FIG. 3 and fall by action of gravity from the drive conveyor onto the return conveyors 20 as shown in FIG. 3. Each return conveyor 20 conveys ejected articles from the portion 20A in proximity to the shaft 23 to the portion 20B in proximity to the loading portion 14A of the drive conveyor 14 whereat the ejected articles fall from the return conveyors 20 onto the drive conveyor 14 as illustrated in FIG. 4. Accordingly, the articles that are loaded onto the machine 9 by the loader 12 may load the articles 10 either on the drive conveyor 14 or the return conveyors 20. The articles 10 on the return conveyor 20 will fall on the drive conveyor about at the loading portion 14A. The combination of the V shape of the drive conveyor 14 and the derailers 31 and 32 enable the device 9 to arrange the articles in a single file on the drive conveyor 14 and to eject the articles by action of gravity onto the return conveyors 20 which vary from a single file.

FIG. 2 illustrates a circuit associated with the device 9 for enabling the sensing of a preferred orientation of the articles 10 separated on the drive conveyor 14. Sensor means generally shown as 40 comprise light source means 41 and photosensitive means 42, which are connected to an ejector control means 45 for controlling an ejector shown as an air jet 46. The ejector control 45 may be set to determine the orientation of an article 10 as it passes between the light source means 41 and the photosensitive means 42. Articles varying from a preferred orientation, e.g. the articles which are twisted, or are one on top of another, are detected by plural photosensitive devices in the photosensitive means 42 to activate the air jet 46 for ejecting the articles 10 from the drive conveyor 14 to the return conveyor 20 thereby allowing only articles of a preferred orientation to be conveyed to the left of shaft 23 in FIG. 2. The ejector thus acts as a gate and may be a mechanical gate or other similar means.

The ejector control 45 may in the alternative be connected to a counter 53 by a connector means 54 to activate the air jet 46 after a preselected number of articles 10 pass between the light source means 41 and the photosensitive means 42. Accordingly, if 100 items are desired, the counter 53 is preset to 100 and the drive conveyor 14 feeds items between the light source means 41 and the photosensitive means 42. As the number of articles counted approach the preselected number, for example 95, the counter provides a signal on line 61 to reduce the speed of motor 26 thereby decreasing the rate of conveyance by the drive conveyor 14. Upon the counter circuit 53 sensing the preselected number of articles, 100, the ejector means 45 activates air jet 46 to a second state to keep the articles from being discharged onto chute 25 by ejecting the articles from the drive conveyor 14 onto the return conveyor 20. The ejector control 45 and counter 53 may automatically reset after a period of time to begin counting a new series of 100 items. In this arrangement, only a single photosensitive device 42 is required since the ejector control is connected to be a counter.

FIG. 2 also illustrates a second control shown generally as 50 comprising light source means 51 and photosensitive means 52 connected to the counter circuit 53 and a gate control circuit 55 for controlling a mechanical gate 56. A first and a second chute 59 and 60 may receive the articles 10 discharged from the drive conveyor 14. Assuming that gate 56 is in the position shown, the counter circuit 43 will count the number of articles passing between the light source 51 and the photosensitive means 52 and discharge the numbered articles onto the first chute 59. As the counter circuit approaches the preselected count which is preprogrammed into the counter circuit 53 the counter circuit provides a signal on line 61 to reduce the speed of motor 26 thereby decreasing the rate of conveyance by the drive conveyor 14 when nearing the desired count. Upon the counter circuit 53 sensing the preselected number of articles, the counter circuit activates the gate control 55 to move gate 56 into the phantom position to begin ejecting the articles to the second chute 60. The counter circuit 53 returns the motor 26 to the normal speed and resets the internal counter circuit. The invention shown in FIGS. 1-4 enables the machine 9 to feed in single file, orientate and to count similarly shaped articles 10 and discharge them into plural article chutes.

Figure 5:
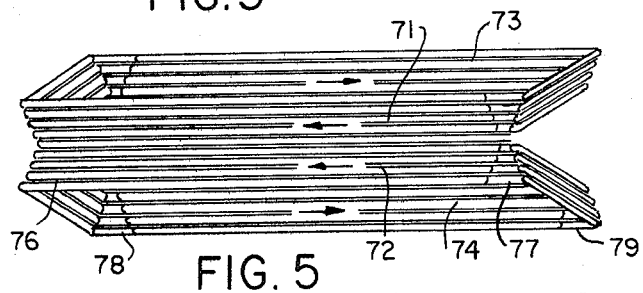
FIG. 5 is a top view of a modification of the machine shown in FIG. 1 incorporating integral drive and return conveyor means.
Figure 6:
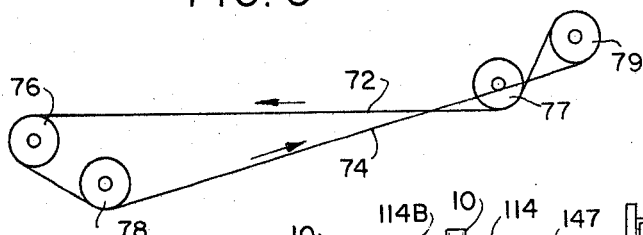
FIG. 6 is a side view of the machine shown in FIG. 5.

FIGS. 5 and 6 are top and side views of a variation of the invention shown in FIGS. 1-4. In this embodiment, the drive conveyor means comprises a first and a second drive conveyor 71 and 72 and a first and a second return conveyor 73 and 74. It should be noted that the drive conveyor 71 and the return conveyor 73 are the same conveyor element and the drive conveyor 72 and return conveyor 74 are the same conveyor element. This modification uses the forward run of the conveyor belts as the drive conveyors 71 and 72 and uses the rear run of the conveyor belts as the return conveyors 73 and 74. FIG. 6 is a side view of the drive and return conveyors 72 and 74 illustrating that the drive conveyor 72 extends between pulleys 76 and 77 and that the return conveyor 74 extends between pulleys 78 and 79. The drive and return conveyor 71 and 73 are mounted substantially the same as conveyors 72 and 74 except of opposite hand. It should also be noted that the drive conveyors 71 and 72 may be mounted at an angle relative to one another forming a V shape surface as shown in FIGS. 3 and 4 or may use tapered pulleys as shown.

Figure 7:
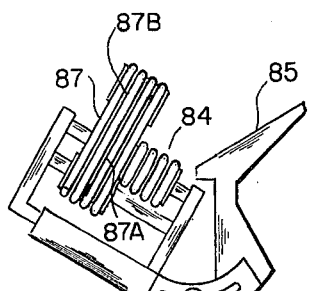
FIG. 7 is an end view of modification of the machine shown in FIGS. 1-6.

FIG. 7 illustrates a modification of the invention shown in FIGS. 1-6 wherein the drive conveyor means comprises a single drive conveyor on a single side of a V shaped surface. A drive conveyor 84 forms a V shaped conveyor with a surface 85 with the return conveyor 87 having a portion thereof 87A established below the drive conveyor 84 and having a portion thereof 87B established above the drive conveyor 84. An adjustment slot 90 in conjunction with a locking device shown as a screw 91 enables the V formed by the drive conveyor 84 and the surface 85 to be varied in accordance with the shape of the articles to be conveyed.

Figure 8:
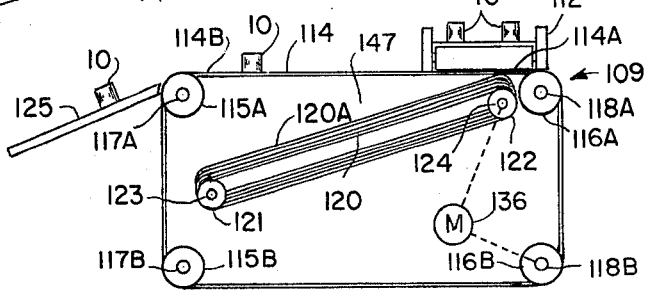
FIG. 8 is a simplified view of the modification of the machine shown in FIGS. 1-7 along line 8—8 in FIG. 10 but to a reduced scale.
Figure 10:
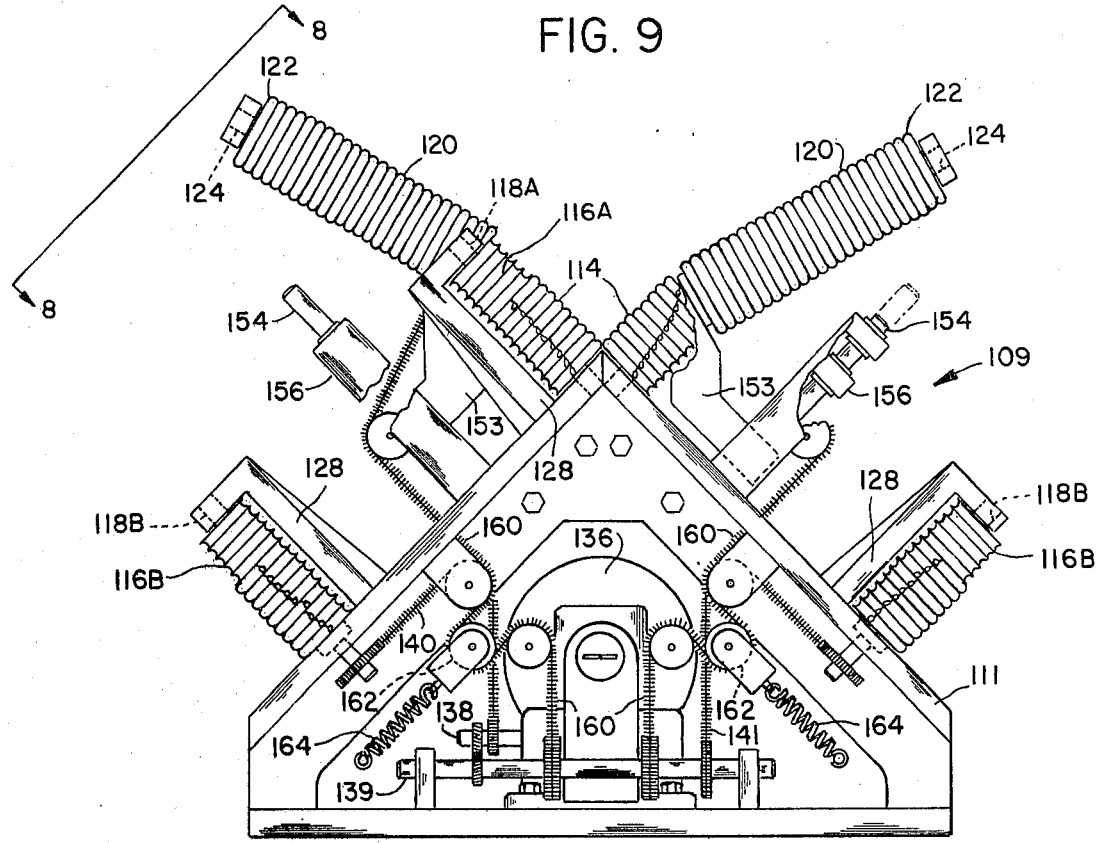
FIG. 10 is a rear view of the machine shown simplified in FIG. 8, with belts broken away to better show the construction.

FIG. 8 is a simplified side view along lines 8—8 in FIG. 10 of a variation of the inventions set forth in FIGS. 1-7. The machine comprises a drive conveyor means 114 having a loading portion 114A and a discharge portion 114B suspended on a frame 111 between forward pulleys 115A and 115B and rear pulleys 116A and 116B. The forward pulleys 115A and 115B are respectively journalled on shafts 117A and 117B wherein the rear pulleys 116A and 116B are respectively journalled on shafts 118A and 118B. A loading device 112 loads the articles 10 on the loading portion 114A to be conveyed therefrom to the discharge portion 114B to discharge to a chute 125 as heretofore explained. Return conveyor means 120 is suspended between pulleys 121 and 122 respectively journalled on shafts 123 and 124 providing a portion 120A of the return conveyor 120 being below a portion of the drive conveyor 114 and having a portion 120B of the return conveyor at least at the same level as a portion of the drive conveyor 114.

Figure 9:
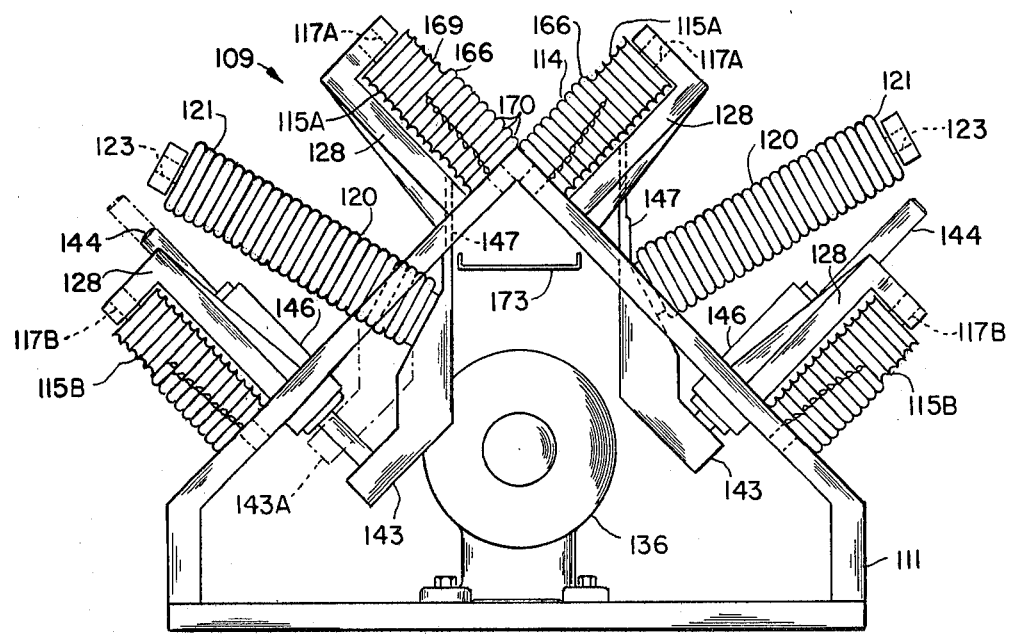
FIG. 9 is a front view of the machine shown simplified in FIG. 8; with belts broken away to better show the construction

FIGS. 9 and 10 illustrate front and rear detailed views of the machine 109 shown in FIG. 8. The drive conveyor means 114 comprises two drive conveyors mounted on pulleys 115A, 115B, 116A and 116B rotatable on shafts 117A, 117B, 118A and 118B established relative to the frame 111 to form the substantially V shaped drive conveyor for conveying the articles. Support members 128 support the shafts 117A, 117B, 118A, and 118B and are mounted on the inside perimeter of the drive conveyor means 114. A motor 136 drives shafts 138 and 139 to power chains 140 and 141 to drive the drive conveyors 114, through shafts 118B.

The return conveyor means 120 comprises a first and a second return conveyor located on a first and a second side of the drive conveyor means 114 with each return conveyor 120 being adjustably mounted relative to the frame 111. The front pulleys 121 are journalled on shafts 123 mounted on mounting members 143 which are secured to tubular member 144. The tubular members 144 are movably mounted to tubular receivers 146 secured to the frame 111. Walls 147 extend from the mounting members 143 and fill the gap between the drive conveyors 114 and the return conveyors 120.

The rear pulleys 122 are journalled on shafts 124 mounted on mounting members 153 which are secured to tubular members 154. The tubular members are movably mounted to tubular receivers 156 secured to the frame 111. The motor 136 drives shaft 139 and chains 160 to rotate pulleys 122 to move the return conveyor 120. Movable pulleys 162 are urged by springs 164 and compensate for the change in length of chain 160 upon adjustment of the return conveyors 120.

The device shown in FIGS. 8-10 may be adjusted in accordance with the size of the articles to be conveyed. The left side of the machine in FIG. 9 which is the right side of the machine in FIG. 10 is shown adjusted for a smaller article relative to the other half of the machine in the respective FIGS. 9 and 10. Adjustment is accomplished by removing some of the conveyor bands of the drive conveyor 114 as shown by the area 169 devoid of conveyor bands in FIG. 9 to reduce the size of the V shape of the drive conveyor 114. To compensate for the reduced drive conveyor size the return conveyor 120 on the left in FIG. 9 is moved from the phantom position 143A such that the wall 147 is adjacent the last band 166 of the drive conveyor 114 as shown. A similar adjustment is done for both the front and the rear pulleys 121 and 122 on both sides of the machine. The pulleys 115A, 115B, 116A and 116B of the drive conveyor extend outwardly of the pulleys 121 and 122 of the return conveyor 120 enabling the drive conveyor belts or bands 166 to be removed independently of the return conveyors 120. To adjust the device for a different size object, one need only add or remove the appropriate number of belts or bands from the drive conveyor 114 and adjust out or in the front and rear pulleys 121 and 122 of the return conveyors 120.

The invention shown in FIGS. 8-10 has the ability to orientate peculiarly shaped items such as baby bottle nipples when the different sides of the V of the drive conveyor are driven at differential speeds. Differential speed may include one side of the V being driven in a direction opposite to the other side of the V, one side being static, or at different speeds. Several of the conveyor bands such as bands 170 near the bottom of the V may be removed allowing the non-oriented objects to fall into the center of the machine to be caught thereby by an appropriate catching device 173 to be recycled back to the drive conveyor 114 by means not shown. The various shafts including 138 and 139 located in proximity to the motor 136 in FIG. 10 enable differential speeds to be applied to chains 140 and 141 merely using different sprocket gears and the like.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine for receiving similarly shaped articles from a loading station and discharging the articles in a single file, comprising in combination:

conveyance means having a drive and a return conveyor means with said drive conveyor means having a loading portion and a discharge portion;

motor means for moving said conveyance means for enabling conveyance of the articles from said loading portion to said discharge portion of said drive conveyor means and discharging the articles therefrom;

first means mounting said drive conveyor means for receiving the similarly shaped articles from the loading station at said loading portion of said drive conveyor means;

separator means including said conveyance means for separating the articles in a single file on said drive conveyor means and for ejecting the articles from said drive conveyor means which vary from a single file;

said return conveyor means having a first longitudinal side, said drive conveyor means having a second longitudinal side, second means for mounting said return conveyor means with said first longitudinal side thereof in a first vertical plane closely adjacent a second vertical plane containing said second longitudinal side of said drive conveyor means, said first and second mounting means relatively mounting said drive and return conveyor means so that the longitudinal dimensions thereof are at an angle relative to each other and crossing at an intermediate point enabling said ejected articles to fall by action of gravity from said drive conveyor means to said return conveyor means and conveyed thereby to a higher elevation than said drive conveyor means to fall by action of gravity to return to said loading portion of said drive conveyor means, said drive conveyor means having a V-shape in transverse cross-section at said loading portion to aid in containing the articles, said return conveyor means including a first and a second return conveyor mounted adjacent a first and said second side of said drive conveyor means, respectively, and said return and drive conveyor means together are substantially V-shaped in transverse cross-section at the intermediate crossing point of said return and drive conveyor means.

2. A machine as set forth in claim 1, wherein said conveyance means includes conveyor belt means.

3. A machine as set forth in claim 1, wherein said separator means includes a longitudinal passage along a portion of said drive conveyor means having a cross-sectional shape in accordance with the shape of one of the articles.

4. A machine as set forth in claim 1, wherein said separator means includes a substantially vertical plate between said return and drive conveyor means.

5. A machine as set forth in claim 1, wherein said separator means includes derailer means located between said drive conveyor means and said return conveyor means.

6. A machine as set forth in claim 1, including ejector means mounted relative to said drive conveyor means;

said ejector means having a first and a second state;

and said ejector means enabling discharge of the articles from said conveyor means when said ejector means is in said first state and prohibiting discharge of the articles from said conveyor means when said ejector means is in said second state.

7. A device as set forth in claim 6, wherein said ejector means ejects the articles from said drive conveyor means to said return conveyor means when said ejector means is in said second state.

8. A machine as set forth in claim 6, wherein said ejector means includes gate means.

9. A machine as set forth in claim 6, wherein said ejector means includes air jet means.

10. A machine as set forth in claim 6, including sensor means for sensing the presence of the articles on said drive conveyor means for controlling said ejector means.

11. A device as set forth in claim 9, wherein said ejector means includes counter means for counting the number of articles discharged from said drive conveyor means.

12. A device as set forth in claim 1, including means connecting said counter means to control said ejector means into said second state upon said counter means sensing a predetermined number of discharged articles.

13. A device as set forth in claim 12, including means connecting said counter means to said motor means for reducing the speed of said drive conveyor means prior to said counter means counting said predetermined number of discharged articles.

14. A device as set forth in claim 9, wherein said sensor means senses the orientation of each article in proximity to said discharge portion of said drive conveyor means.

15. A device as set forth in claim 1, including a first and a second receiver for receiving articles discharged from said drive conveyor means;

gate means mounted relative to said drive conveyor means and having a first and a second state;

and said gate means enabling discharge of the articles from said drive conveyor means to said first receiver when said gate means is in said first state and enabling discharge of the article from said drive conveyor means to said second receiver when said gate means is in said second state.

16. A device as set forth in claim 15, including counter means for counting the number of articles discharged from said drive conveyor means into one of said first and second receivers to change the state of said gate means after discharge of a predetermined number of articles.

17. A machine as set forth in claim 1, including means for adjusting the size of said drive conveyor means in accordance with the size of the articles.

18. A machine as set forth in claim 1, including means for adjusting the size of said drive conveyor means in accordance with the size of the articles;

and means for varying the position of said return conveyor means in accordance with the change in size of said drive conveyor means.

19. A machine as set forth in claim 1, wherein said first mounting means includes means mounting said drive conveyor means to extend between a plurality of drive conveyor pulleys and said second mounting means includes means mounting said return conveyor means to extend between a plurality of return conveyor pulleys for enabling said drive conveyor means to be removed independently of the return conveyor means.

20. A machine as set forth in claim 19, wherein said second mounting means includes means to vary the axial position of said plurality of return conveyor pulleys.

21. A machine as set forth in claim 1, wherein said return conveyor means is transversely tilted toward said drive conveyor means at said loading portion thereof to aid the gravity return of articles to said loading portion.

22. A machine for receiving similarly shaped articles from a loading station and discharging the articles in a single file, comprising in combination:

conveyance means having a drive and a return conveyor means with said drive conveyor means having a loading portion and a discharge portion;

motor means for moving said conveyance means for enabling conveyance of the articles from said loading portion to said discharge portion of said drive conveyor means and discharging the articles therefrom;

first means mounting said drive conveyor means for receiving the similarly shaped articles from the loading station at said loading portion of said drive conveyor means;

separator means including said conveyance means for separating the articles in a single file on said drive conveyor means and for ejecting the articles from said drive conveyor means which vary from a single file;

said return conveyor means having a first longitudinal side, said drive conveyor means having a second longitudinal side, second means for mounting said return conveyor means with said first longitudinal side thereof in a first vertical plane closely adjacent a second vertical plane containing said second longitudinal side of said drive conveyor means, said first and second mounting means relatively mounting said drive and return conveyor means so that the longitudinal dimensions thereof are at an angle relative to each other and crossing at an intermediate point enabling said ejected articles to fall by action of gravity from said drive conveyor means to said return conveyor means and conveyed thereby to a higher elevation than said drive conveyor means to fall by action of gravity to return to said loading portion of said drive conveyor means, said drive conveyor means having a V-shape in transverse cross-section at said loading portion to aid in containing the articles, said return conveyor means including a first and a second return conveyor mounted adjacent a first and said second side of said drive conveyor means, respectively, and said return and drive conveyor means together have a substantially V-shaped transverse cross-section at said loading portion.

* * * * *